United States Patent [19]

Takami

[11] Patent Number: 4,692,005

[45] Date of Patent: Sep. 8, 1987

[54] DIGITAL DATA OUTPUT FROM A CAMERA

[75] Inventor: Satoshi Takami, Tokyo, Japan

[73] Assignee: Asahi Kogaku Kogyo Kabushiki Kaisha, Tokyo, Japan

[21] Appl. No.: 904,574

[22] Filed: Sep. 8, 1986

[30] Foreign Application Priority Data

Sep. 6, 1985 [JP] Japan .................................. 60-195757
Jun. 30, 1986 [JP] Japan .................................. 61-151784

[51] Int. Cl.⁴ .......................... G03B 7/24; G03B 17/18
[52] U.S. Cl. ...................................... 354/21; 354/289.1
[58] Field of Search ................. 354/21, 412, 468, 465, 354/471, 474, 475, 289.1, 289.12; 73/5

[56] References Cited

U.S. PATENT DOCUMENTS 4,423,934 1/1984 Lambeth et al. .................... 354/412

FOREIGN PATENT DOCUMENTS

113215 6/1985 Japan ......................................... 73/5

Primary Examiner—W. B. Perkey
Attorney, Agent, or Firm—Sughrue, Mion, Zinn, Macpeak & Seas

[57] ABSTRACT

A digitally controlled camera in which a DX code on a film cartridge is read by electrical terminals. Those same terminals are used to output digital data from the camera, such as exposure data or other signals from the digital control means.

8 Claims, 10 Drawing Figures

FIG. 10

DIGITAL DATA OUTPUT FROM A CAMERA

BACKGROUND OF THE INVENTION

1. Field of the Invention

This invention relates to a data confirmation device for a camera, which makes it possible to readily detect camera exposure data signal values in assembling a camera or in the maintenance and inspection of the camera.

More particularly, the invention relates to a various camera data confirming device which utilizes the electrical contacts normally used for inputting DX code so that camera exposure data can be externally confirmed.

2. Background Art

Recently, the automation of camera operations has been remarkably advanced. Therefore, various data for exposure calculation, automatic film winding, automatic ASA sensitivity reading, and a variety of displays are digitized. For instance, in an aperture-priority automatic exposure system, a set aperture value, a field brightness value and a film sensitivity (speed) value are converted into digital data to perform a predetermined APEX (aperture priority exposure) operation. The resultant value of the calculation is converted into analog data to control the shutter speed. However, the brightness value may include an error due to the position of the installed light receiving element or an electrical offset of the A/D conversion circuit. Therefore, during inspection of a camera being assembled, it is necessary to electrically eliminate the error, especially the offset error.

Figure 1:
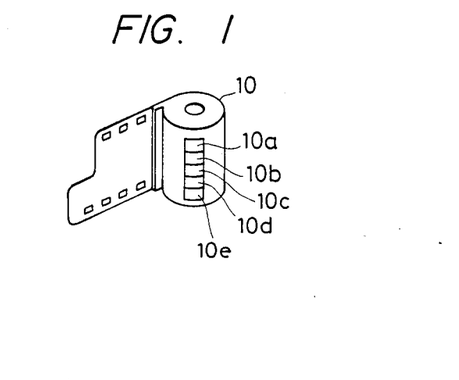
FIG. 1 is a perspective view of a film cartridge with a DX code.
Figure 2:
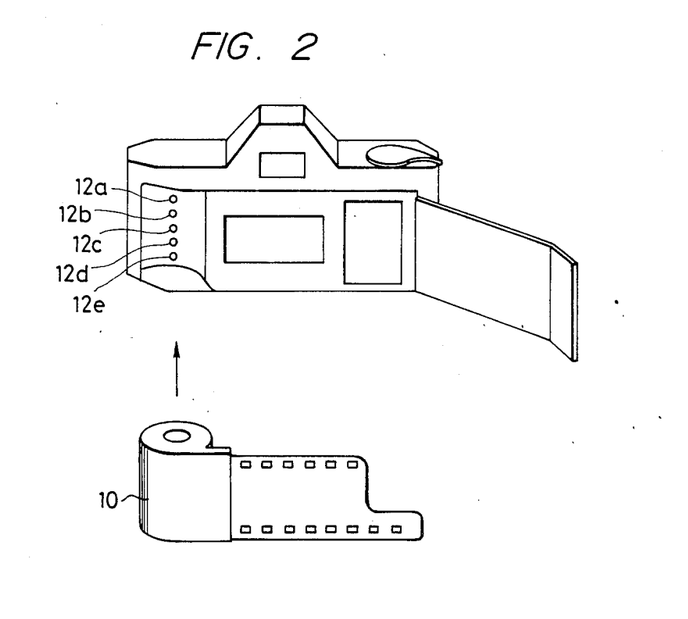
FIG. 2 is a perspective view showing a camera whose rear cover is opened to receive a film cartridge.

In order to transmit the film speed used to the arithmetic circuit in the camera, the following means has been proposed (cf. Japanese Patent Application "OPI" No. 211027/1984, the term "OPI" as used herein means an "unexamined published application"). As shown in FIGS. 1 and 2, selected conductive layers and non-conductive layers are formed at predetermined positions 10a, 10b, 10c, 10d and 10e on the outside of a film cartridge (patrone) 10 according to the sensitivity value of the film. Electrical contacts 12a, 12b, 12c, 12d and 12e are provided in the film cartridge receiving chamber of the camera in such a manner that, when the film cartridge 10 is loaded in the chamber, the conductive and nonconductive layers are brought into contact with the electrical contacts 12a–12e. In this case, an arithmetic circuit in the camera can automatically read the film sensitivity value according to the variation in the combination of the electrical signals conducted through the conductive film cartridge 1 along paths between the contacts 12a through 12d and the grounded electrical contact 12e.

If the circuit operation is carried out with digital data which has been converted from a analog data, it is essential to adjust its A/D conversion circuit and especially the offset value of the A/D conversion circuit. On the other hand, an exposure control circuit employs a method in which, for instance in the case of an aperture-priority automatic exposure system, after necessary electronic circuits including a light receiving element are installed on the camera body, an exposure determination is actually carried out to determine whether or not the aperture value Av and the field brightness value Bv are correctly calculated. A determination of the exposure permits the adjustment of the circuit. However, if, in the method, the values Av and Bv have their errors in opposite directions, these errors, being cancelled out, do not appear in the exposure value. The only method of detecting these errors is to perform the exposure calculation several times under different conditions so that the circuit may be adjusted as a whole. As the digital circuit for exposure operation is generally realized with a micro-computer, it is rather difficult to check the individual digital data. Even in the case where the individual digital signal lines can be monitored from the outside, the circuit itself is considerably small, and therefore it is difficult to suitably position a signal probe and to do so without damaging the circuit.

In the case of a camera, the aforementioned electronic circuits are enclosed in the camera-housing, and therefore it is completely impossible to perform the maintenance and inspection for variations of the offset error or the like.

SUMMARY OF THE INVENTION

Accordingly, an object of this invention is to provide a device which can readily confirm as digital values various data inside a camera, especially exposure data for exposure operation.

Accordingly, the invention provides an exposure data confirming device for a camera in which a digital operation circuit determines photographic conditions permitting a photographing operation according to a desired exposure value. The exposure data confirming device has one or more of electrical terminals for reading a DX code on a film cartridge. According to the invention, the device comprises a switch and a circuit for providing, in response to a change-over signal outputted by the switch, at least one exposure data used in the digital operation circuit at the DX code reading terminals.

DETAILED DESCRIPTION OF THE PREFERRED EMBODIMENTS

This invention will be described with reference to its preferred embodiments shown in the accompanying drawings.

Figure 3:
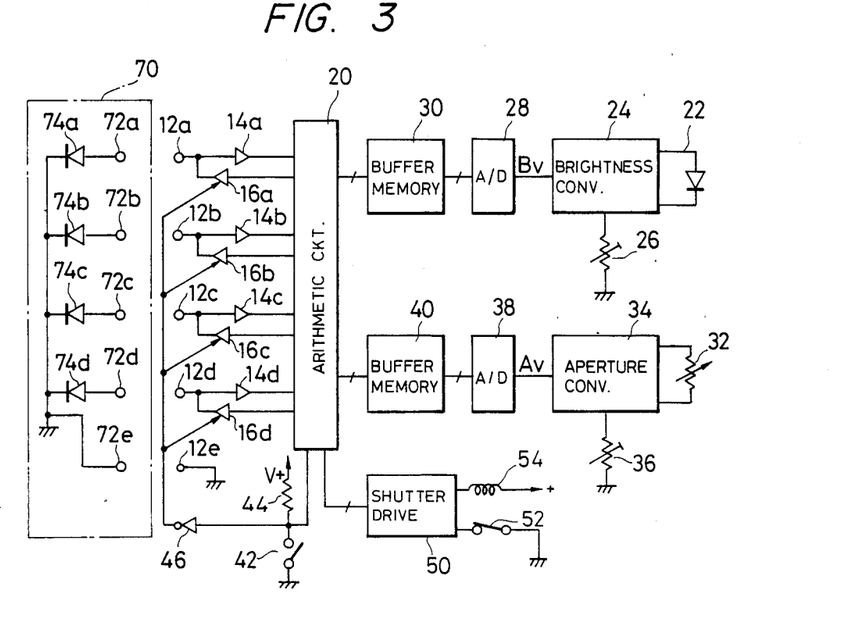
FIG. 3 is a block diagram showing a first example of a camera exposure data confirming device according to the invention.

FIG. 3 is a block diagram showing a first example of a camera exposure data confirming device of the invention which is applied to an aperture-priority automatic exposure camera. In FIG. 1, a main arithmetic circuit 20 calculates exposure values and performs the principal activity of the device of the invention. A light receiving element 22 receives light from the field of view to produce an electrical signal corresponding to the quantity of light. A conventional Bv (brightness value) conversion circuit 24 comprising a logarithmic compression circuit converts the output of the light receiving element 22 into a value which is suitable for an APEX (aperture priority exposure) calculation which is carried out in a rear stage. In order to compensate any error arising during installation of the light receiving element 22 and the offset error of an A/D (analog-to-digital) conversion which is performed in a rear stage, a Bv adjusting variable resistor 26 is connected to the Bv conversion circuit 24. In an A/D converter 28, the analog output signal of the conversion circuit 24 is converted into a digital signal which is stored in a Bv buffer memory 30. The output of the Bv buffer memory 30 is connected to an input port of the main arithmetic circuit 20.

Further in FIG. 3, the resistance of a variable resistor 32 is changed with the rotation of the ring controlling the lens aperture. The resistance of the variable resistor 32 is converted by a Av conversion circuit 34 into a value which is suitable for the APEX calculation. In order to compensate the offset error of the A/D conversion which is performed in a rear stage, an Av adjusting variable resistor 36 is connected to the conversion circuit 34. An A/D converter 38 converts the analog output signal of the conversion circuit 34 into a digital signal which is stored in a buffer memory 40. The output of the buffer memory 40 is connected to an input port of the main arithmetic circuit 20.

DX code reading electrical contacts 12a, 12b, 12c and 12d, also shown in FIG. 2, are connected respectively through buffers 14a, 14b, 14c and 14d to respective input ports of the main arithmetic circuit 20. An electrical contact 12e is grounded. The electrical contacts 12a-12d thus apply the sensitivity value of the film being used to the main arithmetic circuit 20.

Output ports of the main arithmetic circuit 20 are connected through tri-state buffers 16a, 16b, 16c and 16d to respective ones of the aforementioned electrical contacts 12a, 12b, 12c and 12d. The main arithmetic circuit 20 is provided with a switch 42 adapted to form a switching signal which switches the operation of the main arithmetic circuit 20 into a DX terminal output mode. In the operation of the DX terminal output mode, a Bv value and an Av value are applied through output ports of the main arithmetic circuit 20 to the electrical contacts 12a through 12d. One terminal of the switch 42 is grounded, and the other terminal is connected through a pull-up resistor 44 to a predetermined voltage. The switching signal provided by the switch 42 is applied to the main arithmetic circuit 20 and through an inverter 46 to the control terminals of the tri-state buffers 16a through 16d. The output impedances of the tri-state buffers 16a through 16d are increased as the voltages at the control terminals are decreased.

As for the exposure calculation, the main arithmetic circuit 20 calculates a value Tv for shutter time according to the following equation:

$$Tv = Bv + Sv - Av,$$

where Sv is the film speed or sensitivity. The main arithmetic circuit 20 supplies a count value concerning the Tv value to a shutter drive circuit 50. The shutter drive circuit 50 is started by a switch 52 which is turned off when the shutter is opened. The shutter drive circuit 50 forms a conventional signal such as a signal having a time width corresponding to a shutter time according to the count value, so as to control a shutter control magnet 54. The switch 52 of the shutter drive circuit is turned on when the film is wound. The arrangement of the shutter mechanism is conventional and does not relate directly to the invention. Therefore, its detailed description will be omitted.

Figure 4:
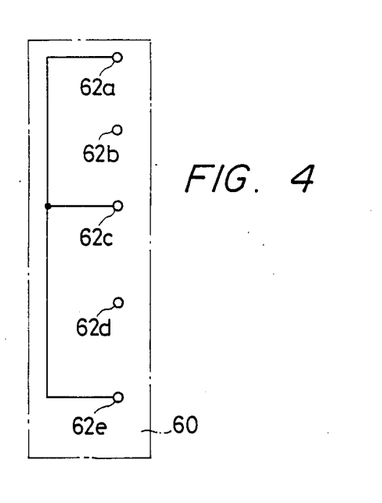
FIG. 4 is an equivalent circuit diagram of a film cartridge (patrone) with a DX code.

FIG. 4 is a diagram showing an example of an equivalent electrical circuit of the insulators and the conductors which are formed by a coating on the outer cylindrical wall of a film cartridge (patrone) 60. When the film cartridge is loaded in the camera, the electrodes 62a, 62b, 62c, 62d and 62e are brought into contact with the respective terminals 12a, 12b, 12c, 12d and 12e, respectively. The fact that the electrodes 62b and 62d are not connected to the electrode 62e means that the positions on the film cartridge which correspond to the electrodes 62b and 62d are not conductive.

Referring back to FIG. 3, this figure conceptually shows a display unit 70 for displaying exposure data Bv and Av which are outputted at the electrical contacts 12a through 12d by the main arithmetic circuit 20. Terminals 72a, 72b, 72c, 72d and 72e are so provided as to contact respectively with the electrical contacts 12a, 12b, 12c and 12e. The digital values of voltages at the electrical contacts 12a through 12d can be displayed or confirmed with LEDs (light emitting diodes) 74a through 74d, respectively. It goes without saying that the LEDs may be replaced by oscilloscopes or logic analyzers.

Figure 5:
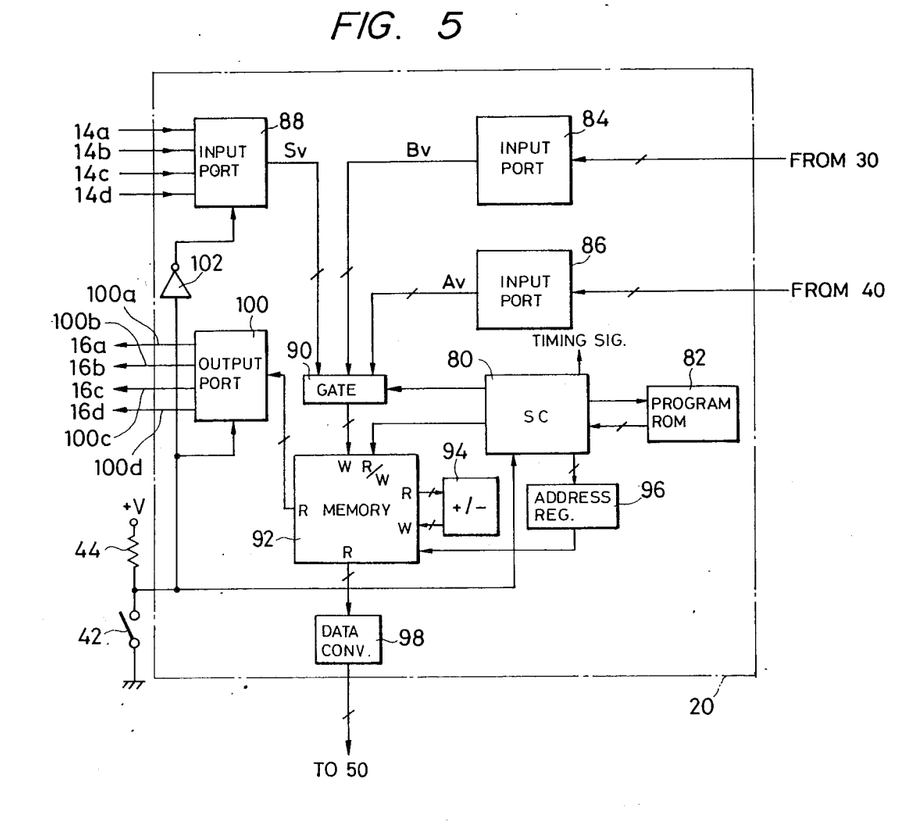
FIG. 5 is a block diagram showing a main arithmetic circuit in the device shown in FIG. 3.

FIG. 5 is a block diagram showing the main arithmetic circuit 20 in detail. However, it should be noted that in practice the main arithmetic circuit 20 is realized by using a microcomputer, and strictly speaking, FIG. 5 is a block diagram for describing only the functions of the microcomputer.

In FIG. 5, a sequence controller 80 controls a series of operations of the main arithmetic circuit 20. However, for convenience in description, some of the control signals to various circuit elements are not shown. A ROM 82 containing program software regulates the operation of the sequence controller 80. The sequence controller 80 operates to supply the Bv value in the memory 30 through an input port 84 to a change-over gate 90 so that it is written into a predetermined address in a main memory 92. The sequence controller 86 also operates to send the Av value in the Av memory 40 through an input port 86 to the change-over gate 90 so that it is stored in another predetermined address in the main memory 92. It further operates to supply the DX code provided at the electrical terminals 14a through 14d through an input port 88 to the change-over gate 90 so that it is written in a predetermined address in the main memory 92. Further in FIG. 5, an address register 96 addresses the main memory 92.

When the operation mode changing switch 42 is open, the ordinary exposure calculation is carried out. Therefore, in this case, the sequence controller 80 operates to convert the DX code value in the main memory 92 into a film sensitivity value Sv which is suitable for the APEX calculation, and thereafter to calculate a shutter time according to the equation Tv=Bv+Sv−Av by using the values Av, Bv and Sv. This calculation is carried out by an addition and subtraction circuit 94. The conversion of a DX code value into an Sv value may be performed immediately after the DX code has been written in the main memory 92. The conversion may be carried out by utilizing a reference table technique.

After the Tv value has been obtained, a count value suitable for determination of a shutter time is calculated from the Tv value thus obtained. The count value thus calculated is supplied to a data conversion circuit 98. The data conversion circuit 98 operates to convert the count value into a signal which is suitable for the shutter drive circuit 50, and to supply the signal to the shutter drive circuit 50.

When the operation mode changing switch 42 is closed, the sequence controller 80 operates to read the Av value and the Bv value out of the main memory 92 and to apply them to an output port 100. At the same time, the output port 100 is made active while the input port 88 is made inactive by the changed voltage from resistor 44. In FIG. 5, an inverter 102 inverts the voltage on the resistor 44.

The Av value and the Bv value can be outputted through the output port 100 in various manners. For instance, a method may be employed in which parallel signals are converted into a serial signal, and the serial signal is outputted through one of lines 100a through 100d in the order of the Av value and then of the Bv value. In this case, the remaining lines (100a through 100d) are used for a synchronizing signals and/or an Av and Bv discrimination signal. Two of the lines may be separately used for the Av value and the Bv value. In addition, a method may be used in which the Av value is applied to the four lines 100a through 100d for successive predetermined numbers of bits, and then a Bv value is also supplied to the lines in the same manner.

It is preferable that both a signal indicating which of the Av and Bv value is being outputted and the synchronizing signal be outputted together. However, if the speed of outputting signals through the output port 100 is low, then one or both of these signals may be eliminated.

Figure 6:
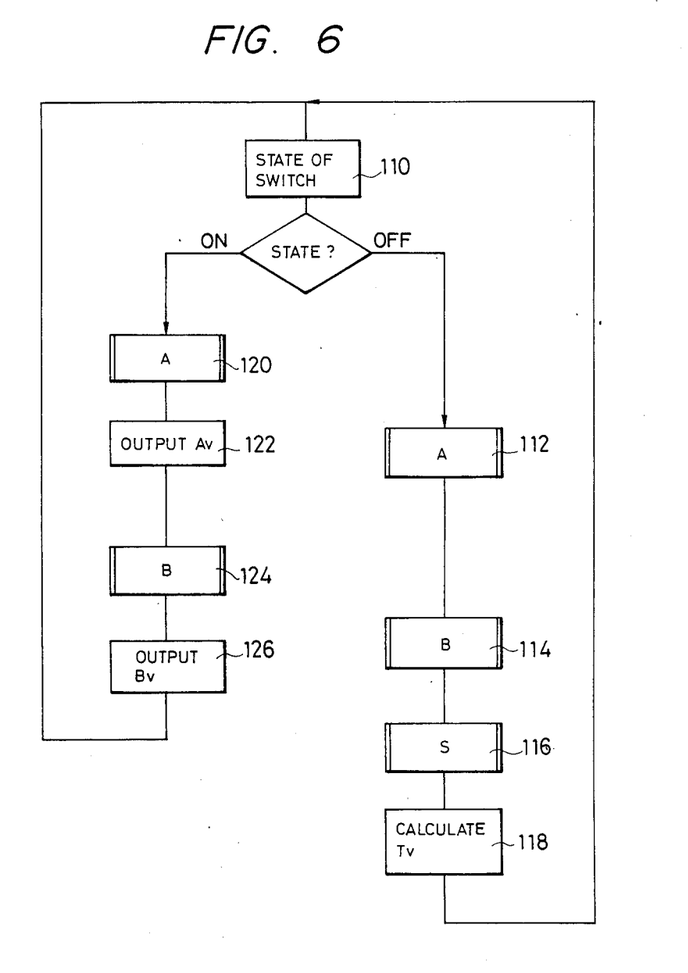
FIG. 6 is a flow chart for a description of the operation of the device shown in FIG. 3.

FIG. 6 is a flow chart showing the operation of the circuit of FIG. 5.

First, the state of the switch 42 is detected (Block 110). If the switch 42 is in "off" state, then the ordinary exposure calculation routine is selected. If it is in "on" state, then the confirmation routine according to the invention is selected.

In the ordinary exposure calculation routine, first it is necessary to read the latest exposure data for exposure control. Therefore, in a subroutine A, the current aperture value Av is read and stored in a predetermined location in the main memory 92 (Block 112). Next, in a subroutine B, the current field brightness value Bv is read and stored in a predetermined location in the main memory 92 (Block 114). Thereafter, in a subroutine S, the DX code is read and converted into a usable value, and the value is stored in a predetermined location in the main memory 92 (Block 116). These values thus stored are utilized to obtain a Tv value (Block 118), and the Tv value is supplied to the data conversion circuit 98. The above-described operations are repeatedly carried out as long as the switch 42 is maintained open.

In the confirmation routine of the invention, the current aperture value Av is stored in the main memory 92 in an operation of the subroutine A (Block 120) and is supplied to the output port 100 (Block 122). The current field brightness value Bv is stored in the main memory 92 in the subroutine B (Block 124) and is applied to the output port 100 (Block 126). The above-described operations are cyclically carried out as long as the switch 42 is maintained closed.

Figure 7:
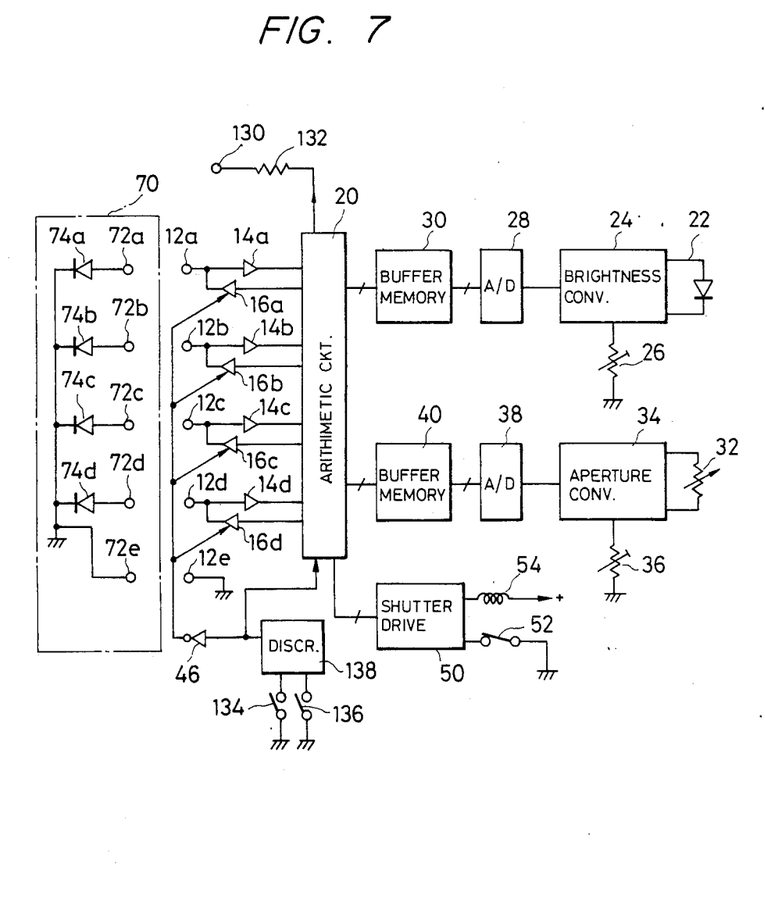
FIGS. 7 and 8 are block diagrams showing a second example of the camera exposure data confirming device according to the invention.
Figure 8:
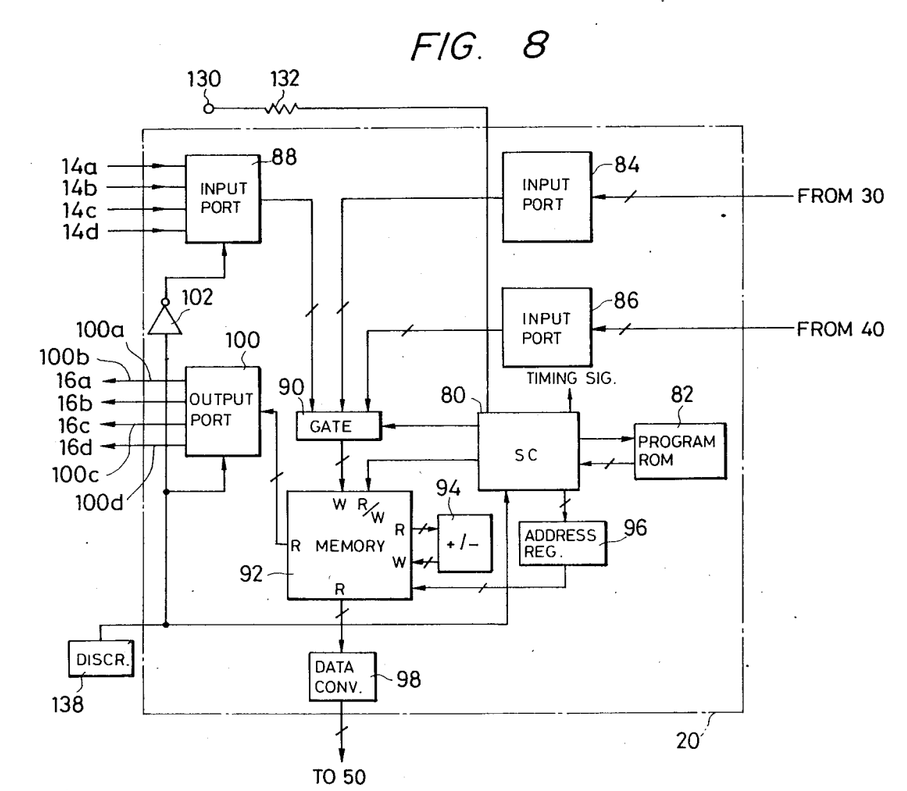

FIG. 7 shows a second example of the camera exposure data confirming device according to the invention. FIG. 8 is a block diagram showing its main arithmetic circuit 20 in detail.

The second example is different from the first example of FIG. 3 in the following points. First, in addition to DX code reading electrical terminals 12a through 12d, an additional output terminal 130 indicates which of the Av and Bv values is being outputted. Secondly, instead of the switch 42, a switch 134 for setting a self-timer and a switch 136 for bulb-mode photography are used together. Then, a switch state discriminating circuit 138 detects the states of the two switches 134 and 136. The outputs of the two switches 134 and 136 are connected by other unshown paths to the arithmetic circuit 20 for their normal usage in bulb and self-timer operational modes. The output terminal 130 may be the X contact of the flash, or a contact for a signal such as a flash charging completion signal or a flash stopping signal which is transmitted between the flash and the camera body. As these contacts are exposed on the outside of the camera case, it is preferable to connect a protective circuit 132 to the output terminal in order to prevent difficulties such as short-circuiting. The signal of the output terminal 130 is one which is, for instance, raised to a high level when the Av value is provided at the DX code reading terminals 12a through 12d and is set to a low level when the Bv value is provided at the terminals. Therefore, on the side of the display unit 70 or the analyzer, it can be determined whether the signal provided at the DX code reading terminals 12a through 12d is the Av value or the Bv value. When the switch state discriminating circuit 138 detects the setting of both the self-timer and the selection of bulb-mode photographic operation (such a combination not being selected for ordinary photography), the discriminating circuit 138 supples the signal to the inverter 46 and the main arithmetic circuit 46. This signal is the same as that which is employed in the case where the switch 42 is closed. Accordingly, in this case, it is unnecessary to provide a special switch, namely, the switch 42 of FIG. 3.

When, in both of the examples of the camera exposure data confirming device, the numbers of bits of data Av and Bv to be outputted are large, sometimes the number of DX contacts are too few to output them as parallel signals at the same time. However, this difficulty can be eliminated by a method in which, for each piece of data, several bits are outputted at a time in such a manner that first several higher-order bits are outputted and then several lower-order bits are outputted. For instance in the case where the Bv value has 6 bits and only four DX contacts 12a through 12d can be used (the contact 12e being grounded), the 6 bits are divided into the three higher-order bits and the three lower-order bits, and the higher-order bits and the lower-order bits are distinguished in time from each other according to the high level and the low level of the output terminal 130.

The Av and Bv values may be outputted not only in the above-described partial parallel mode but also in a completely serial mode. In the latter case, at least one of the DX code reading contacts is used either for classifying the contents of data to be outputted (for instance, for selecting one of the Av and Bv data to be outputted), for providing the synchronizing signal, or for distinguishing the higher-order bits from the lower-order bits. It goes without saying that the output terminal 130 can be utilized in this case. For instance, the DX contact 12d in FIG. 7 may be used for instructing the main arithmetic circuit 20 to output one of the Bv and Av values (for this purpose, the concerned tri-state buffer 16d is not necessary), and the output terminal 130 is used for the synchronizing signal. Further, in synchronization with the synchronizing signal, the higher-order and lower-order bits are successively outputted to the DX contacts 12a through 12c.

The invention has been described with respect to the aperture-priority exposure circuit. However, the technical concept of the invention is applicable to a shutter speed-priority automatic camera or a so-called programmed exposure system.

In the above-described embodiments, only exposure data (namely Bv and Av values) are read out through the DX terminals. However, it should be noted that not only exposure data but also the following data can be read out by using the same circuit.

(1) Camera's supply voltage data

Figure 9:
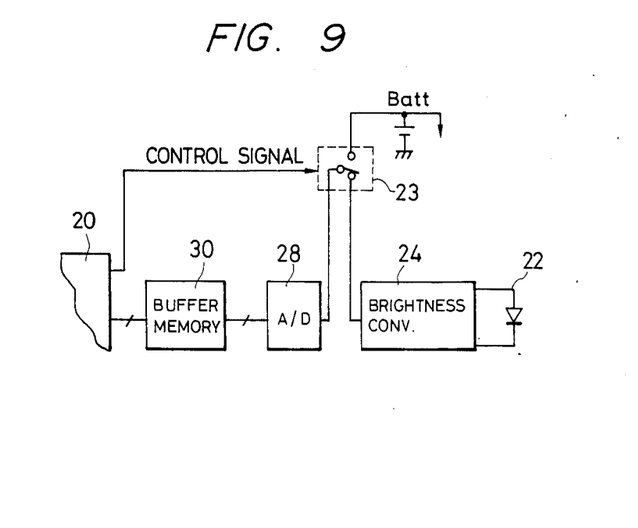
FIGS. 9 and 10 are block diagrams of examples of other data gathering functions of the invention.

As shown in FIG. 9, a supply voltage detecting switch unit 23 is connected, for instance, between the Bv conversion circuit 24 and the A/D conversion circuit 28. A switch in the switch unit 23 is operated by a control signal outputted by the main arithmetic circuit 20 when it is desired to detect the supply voltage of the battery. The armature of the switch is normally kept on the side of the Bv conversion circuit 24. However, it is tripped over to the side of the power supply by the control signal so that the power supply voltage is transmitted to the main arithmetic circuit 20. The data thus detected is transmitted through the same path as the aforementioned exposure data, and outputted through the DX terminals. Therefore, the decrease of the supply voltage can be detected.

(2) Detection of the operation of a timing switch or the like

Figure 10:
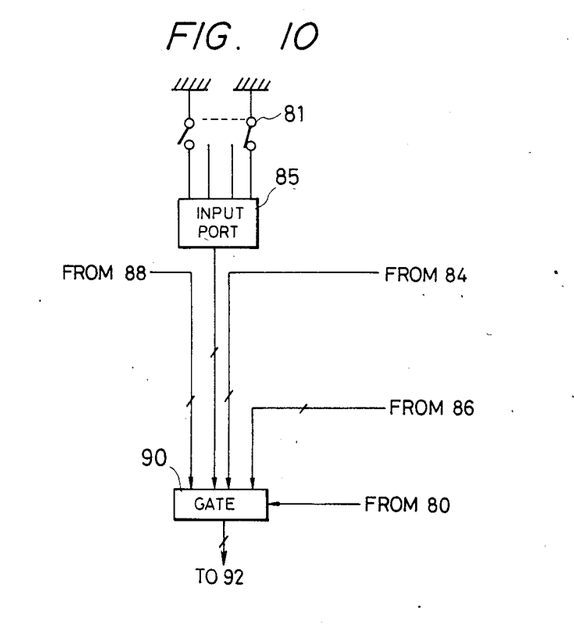

As shown in FIG. 10, in the opening and closing operation of a timing switch 81 or the like, malfunctions are detected such as short-circuiting or unsatisfactory conduction due to poor soldering of the switch. The voltage variation is electrically or mechanically digitized and is written into the main memory 92 through the input port 85 and the change-over gate 90. Similarly as in the previously described case, the voltage variation is applied through the output port 100 to the DX terminals 100a–100d. Thus, the operation of the timing switch or the like can be detected.

(3) Confirmation of data displayed in the finder

Similarly as in the above-described case, the output of the display circuit for operating LEDs (light emitting diodes) in the finder is written through an input port and the switch-over gate 90 into a predetermined address in the main memory 92. This data is then outputted through the output port 100 to the DX terminals 100a–100d by the address signal from the sequence controller 80. Therefore, the data displayed in the finder can be confirmed without the necessity of viewing it through the finder.

(4) Outputting of the average value of exposure data (for instance Tv values)

The exposure data Tv calculated by the addition and subtraction circuit 94 as described above are averaged by the addition and subtraction circuit 94, and the thus averaged exposure data is supplied by the memory 92 through the output port 100 to the DX terminals 100-100d. If the DX terminals are connected to an external computer, then the circuit may have a communication function.

(5) Outputting of the number of times of photographing operations

The number of times of operation of the shutter release switch is counted by a counter in the main arithmetic circuit 20, and is stored in the memory 92. The count value is outputted through the DX terminals in order to confirm the longevity of the camera.

(6) Outputting of the period of time which elapses from the starting of the operation of release switch until its operation is ended A clock function is provided in the main arithmetic circuit 20. A release starting signal produced through a release switch or the like initiates a counting sequence and the counting operation is suspended in response to a release ending signal provided by the mirror-up operation. The obtained count value (the period of time which elapses from the start of the operation of the release switch until the operation of the release switch is ended) is outputted so that, for instance, the follow-up characteristic of the motor drive can be confirmed according to the data thus outputted.

(7) Outputting a flash charging period

Similarly as in the previous paragraph, a clock function is provided in the main arithmetic circuit 20. A flash turn-off signal is received by the main arithmetic circuit 20 through the output terminal 130 for the flash contact so that it initiates counting. In response to a flash-charing completion signal, the counting operation is suspended, and the resultant count value is outputted, as a flash charging period, through the DX terminals. Therefore, the charging period of time can be externally confirmed.

As was described above, the sequence controller 80 is operated according to the instructions written in the programming ROM 82, so that the various data of the above paragraphs (1) through (7) written in the predetermined addresses in the main memory 92 are specified and read out through the output port 100 and the DX terminals. The thus read out values permit the performance of a variety of adjustment and confirmation work.

The above-described embodiments of the invention have four DX code reading electrical terminals (and one grounding terminal). However, the invention is not limited thereto or thereby. That is, there is a case where only one electrical contact is used for distinguishing a high sensitivity film from a low sensitivity film. There is also a case where more than ten electrical contacts are provided to identify a number of kinds of films. In the case where a large number of electrical terminals are provided, a method may be employed in which some of the electrical terminals are used for outputting the Av, Bv and Tv values, and the remaining terminals are used for the synchronizing signal and for an instruction signal for outputting one of the exposure data. When the terminal is used for the instruction signal, the relevant tri-state buffer should be disconnected since it is an obstruction.

As is apparent from the above description, according to the invention either digital exposure data for exposure calculation or a variety of other digital data can be outputted through the electrical contacts which are provided on the outside of the camera housing. Therefore, the offset error in A/D conversion can be readily detected and adjusted. Therefore, during assembling of a camera the adjustment can be readily accomplished, and the maintenance inspection can also be readily achieved.

What is claimed is:

1. A camera, comprising:
   at least one electrical terminal for contacting at different times a film cartridge and a reading device;
   switching means having a first state and a second state;
   means for reading an exposure code from said film cartridge through said electrical terminal when said switching means is in said first state;
   digital means responsive to said reading means for controlling photographic operations; and
   means for impressing upon said electrical terminal a digital signal derived from said digital means when said switching means is in said second state.

2. A camera as recited in claim 1, wherein said digital means includes means for providing exposure data and wherein said digital signal comprises said exposure data.

3. A camera as recited in claim 2, further comprising:
   an optical detector; and
   an aperture sensor; and
   wherein said digital means provides brightness and aperture signals derived from said optical detector and said aperture sensor and wherein said digital signal comprises said brightness and aperture signals.

4. A camera as recited in claim 1, wherein said impressing means comprises tri-state buffering means controlled by said switching means and having an output connected to said electrical terminal.

5. A camera as recited in claim 1, wherein said at least one electrical terminal comprises a plurality of terminals.

6. A camera as recited in claim 1, further comprising a plurality of switches for respective photographic modes, said digital means being responsive to said switches, said switching means comprising means for discriminating states of said switches.

7. A camera as recited in claim 1, further comprising:
   supply voltage means; and
   means for providing a supply voltage signal from said supply voltage means; and
   wherein said digital signal comprises said supply voltage signal.

8. A camera as recited in claim 1, further comprising means for detecting a voltage level in said digital means and wherein said digital signal comprises said voltage level.

* * * * *